United States Patent Office 3,117,983
Patented Jan. 14, 1964

3,117,983
CHEMICAL COMPOSITION AND METHOD
Clifford Norman Matthews, Winchester, Mass., assignor to Diamond Alkali Company, Cleveland, Ohio, a corporation of Delaware
No Drawing. Filed Jan. 30, 1961, Ser. No. 85,464
42 Claims. (Cl. 260—429)

This invention relates to novel organic compounds, their preparation and utilization; more particularly, this invention relates to novel organic compounds and to their preparation via reaction of a zerovalent compound of an element of group VI(B) of the periodic table and a trivalent compound of an element selected from the group consisting of phosphorus, arsenic, antimony and bismuth in the presence of a high boiling solvent.

This is a continuation-in-part of my co-pending application Serial No. 793,259, filed February 16, 1959, now abandoned.

Compounds of this invention are useful in various applications wherein a stable, nonvolatile, organic solvent soluble source of zerovalent metal, e.g., chromium, and/or a carbonyl radical is desired. In particular, advantageous applications of compounds of this invention include use as motor fuel additives, to prevent or minimize knocking, as lubricant additives; in catalysis as in the so-called "Oxo" synthesis or "acrylate" synthesis procedures, as polymerization catalysts or co-catalysts and as active compounds of biologically active compositions, e.g., bactericides, nematocides, insecticides, herbicides, fungicides, or the like.

In a broad sense, novel compounds of this invention can be obtained by the reaction of a zerovalent metal compound of a metal of group VI(B) of the periodic table, i.e., a compound in which the group VI(B) metal has a valence of zero, with a trivalent compound of an element selected from the group consisting of phosphorus, arsenic, antimony and bismuth.

The reference in the specification and claims to "periodic table" is intended to mean Table III, page xxvii of the book, "Chemical Elements and Their Preparations," N. V. Sidgwick, Oxford University Press (1950). Group VI(B) elements as there defined consist of chromium, molybdenum, tungsten and uranium.

Illustrative of zerovalent metal compounds of a metal of group VI(B) are carbonyl compounds of such metals, i.e., compounds containing at least one carbonyl group, e.g., chromium hexacarbonyl, molybdenum hexacarbonyl, tungsten hexacarbonyl and uranium hexacarbonyl. Other illustrative zerovalent compounds are benzene-chromium tricarbonyl, dibenzene chromium, dicumene chromium, 1,2,4,5 - tetramethylbenzenechromium tricarbonyl, 1,2,4-trimethylbenzene chromium tricarbonyl, 1,3,5-triisopropylbenzene chromium tricarbonyl and various chromium, molybdenum, tungsten and/or uranium zerovalent compounds of this invention used per se as reactants in forming other compounds of the invention. Illustrative of trivalent compounds of phosphorus, arsenic, antimony and bismuth are tertiary phosphines, phosphites, arsines, arsenites, stibenes, stibites, bismuthines and bismuthites.

Compounds of this invention may be represented by the structure

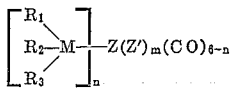

wherein M is an element selected from the group consisting of phosphorus, arsenic, antimony and bismuth; Z and Z' are independently elements of group VI(B) of the periodic table, i.e., chromium, molybdenum, tungsten or uranium; $m$ is 0 or 1; $n$ is a number from 1 to 5, inclusive; $R_1$, $R_2$ and $R_3$ are the same or different, i.e., independently selected, radicals selected from the group consisting of hydrogen, halogen, alkyl, aryl, alkoxy or aryloxy radicals; when $n$ is 1 or greater, M in plural can be the same or different, i.e., independently selected, elements of the indicated group, with the proviso that if $m=0$, then $Z \neq Cr$ when M is phosphorus and $n=2$. In the generic structure set forth hereinbefore, and as used elsewhere in the specification and claims, the terms "halogen" and "halo" are intended to include the various halogens, i.e., fluorine, chlorine, bromine and iodine. Thus, illustrative halogen reactants which can be employed include phosphorus trichloride, phosphorus triiodide, phosphorus trifluoride and phosphorus tribromide, as well as similar iodides, bromides, chlorides and fluorides of phosphorus, arsenic, antimony and bismuth in trivalent form.

The term "alkyl" as used herein is intended to include not only lower alkyl radicals such as methyl, ethyl, propyl, butyl, pentyl, hexyl, heptyl, octyl, nonyl and decyl radicals and isomers thereof, but also higher radicals.

The term "aryl" is intended to include carbocyclic aromatic structures such as phenyl, tolyl, xylyl and haloaryl radicals of the foregoing types containing one or more halogen atoms secured to the aromatic nucleus or to substituents thereon. The term "alkoxy" is intended to include any of the alkyl radicals previously disclosed to which an oxygen atom is attached. Similarly, the term "aryloxy" is intended to include various aryl groups such as those previously disclosed herein to which an oxygen atom is attached. In general, compounds of this invention are stable, nonvolatile, monomeric compounds of the foregoing structure prepared by reaction of a compound of a zerovalent element of group VI(B) of the periodic table with a compound of a trivalent form of an element selected from the group consisting of phosphorus, arsenic, antimony and bismuth. Reaction typically is carried out by heating together two or more reactants of the foregoing types in the presence or absence of a solvent at atmospheric or superatmospheric pressure.

Superior results are obtained in most instances when the reactants are chemically combined by refluxing in a high-boiling organic solvent, i.e., a solvent having a boiling point at atmospheric pressure of at least about 100° C. in an amount of usually about 5 to 10 times the weight of the reactants. Preferred solvents comprise trimethylene glycol, tetrahydrofuran or high-boiling ethers, e.g., bis(2-ethoxyethyl)ether (diethyl Carbitol), dibutyl carbitol, or bis(2-methoxyethyl)ether (diglyme), diglyme being the specifically preferred solvent.

In such instances, at atmospheric pressure, the reaction temperature desirably is maintained at reflux within the range from about 60° to 170° C. Reaction time is relatively short with agitation during reaction being desired; reaction times of about ½ to 6 or 8 hours are typical. In general, a characteristic change from a colorless or pale-colored, e.g., pale yellow, solution to a deep-colored solution marks the course of a reaction of this invention; clouding of the clear solution usually indicates reaction completion.

In practice, a convenient preparation comprises heating the reactants in bis(2-methoxyethyl)ether (diglyme) at the reflux temperature until, in the case of metal carbonyls, all of the carbonyl is consumed. Filtration of the cooled solution gives clear solutions whose color is dependent on the metal involved. The products are obtained by removal of the solvent by distillation under reduced pressure. When the product is solid, purification is effected by repeated recrystallization from a solvent, e.g., a mixture of chloroform and ethanol.

The following illustrates certain compounds embodying this invention:

The resulting mixture is heated with stirring at reflux (about 160° C.) for 4 hours, allowed to cool, and filtered to separate excess chromium hexacarbonyl and a little dark green solid. The solvent is removed from the green-yellow filtrate under reduced pressure at 100° C. The yellow-green solid obtained (76 g., i.e., 83% crude yield) is dissolved in a warm solution of chloroform (150 ml.) and ethanol (100 ml.), filtered while warm and allowed to cool. Pale yellow crystals form (20 g., M.P. 130°–132° C.) and are washed with cold ethanol. On standing, a further crop of 41 g. of yellow crystals forms which are recrystallized from chloroform-ethanol to give 28 g. of pale yellow crystals, M.P. 127°–128° C.

TABLE I

| Example No. | | Physical form | M.P., °C.[1] | Yield[12] | | Analysis | | | | | | | | M. wt. | |
|---|---|---|---|---|---|---|---|---|---|---|---|---|---|---|---|
| | | | | | | Percent carbon | | Percent hydrogen | | Percent chromium | | Percent phosphorus | | | |
| | | | | C. | P. | Cal. | Fd. | Cal. | Fd. | Cal. | Fd. | Cal | Fd. | Cal. | Fd. |
| 1 | $(C_6H_5)_3PCr(CO)_5$ | Pale yel. crystals | 127–128 | 84 | 31 | 60.8 | 60.8 | 3.3 | 3.3 | 11.5 | 11.3 | 6.8 | 6.8 | 454 | 458 |
| 2 | $(C_6H_5)_3PMo(CO)_5$ | Wh. cryst | 138–139 | 91 | 52 | 55.5 | 55.6 | 3.0 | 3.0 | (2) | | 6.2 | 5.7 | 498 | 495 |
| 3 | $(C_6H_5)_3PW(CO)_5$ | Pale yel. crystals | 146–147 | 84 | 42 | 47.2 | 47.0 | 2.6 | 2.7 | (3) | | 5.3 | 5.0 | 586 | 593 |
| 4 | $(NCCH_2CH_2)_3PCr(CO)_5$ | Wh. cryst | 136–137 | 62 | 23 | 43.7 | 43.8 | 3.1 | 3.0 | 13.5 | 13.3 | 8.1 | [9] 7.7 | | |
| 5 | $(C_6H_5O)_3PCr(CO)_5$ | do | 59.5–60 | 81 | 45 | 55.0 | 55.0 | 3.0 | 3.1 | 10.3 | 10.2 | 6.2 | 6.2 | 502 | 495 |
| 6 | $[(C_6H_5O)_3P]_2Cr(CO)_4$ | do | 148–149 | 89 | 67 | 61.2 | 60.8 | 3.8 | 4.0 | 6.6 | 6.6 | 7.9 | 7.8 | | |
| 7 | $[(C_6H_5)_3P]_3Cr(CO)_3$ | do | 126–126.5 | 69 | 30 | 64.2 | 64.4 | 4.2 | 4.6 | 4.9 | 5.0 | 8.7 | 8.2 | | |
| 8 | $[(C_4H_9O)_3P]_2Cr(CO)_4$ | Gr. liquid | (10) | 105 | | 50.6 | 51.3 | 8.1 | 9.2 | 7.8 | 8.2 | 9.3 | 9.4 | 664 | 660 |
| 9 | $(C_6H_5)_3AsCr(CO)_5$ | Yel. cryst | 135–135.5 | 96 | 55 | 55.4 | 55.4 | 3.0 | 3.0 | 10.5 | 9.3 | (4) | | | |
| 15 | $(C_6H_5)_3SbCr(CO)_5$ | do | 147–149 | 83 | 43 | 50.7 | 50.6 | 2.8 | 2.7 | 9.5 | 9.3 | (5) | | | |
| 16 | $[(C_6H_5)_3P]_2Mo(CO)_4$ | Wh. cryst | 110–111 | 97 | 32 | 58.0 | 57.7 | 3.7 | 3.7 | (6) | | 7.5 | 7.2 | | |
| 17 | $[(C_6H_5)_3P]_3Mo(CO)_3$ | do | 142.143 | 59 | 11 | 61.6 | 61.4 | 4.1 | 3.7 | (7) | | 8.4 | 8.7 | | |
| 18 | $(C_4H_9)_3PCr(CO)_5$ | Chartreuse liquid. | (8) | 100 | | 51.8 | 51.5 | 6.9 | 7.2 | 13.2 | 12.9 | 7.9 | 7.5 | | |
| 19 | $[(C_4H_9O)_3P]Cr(CO)_3$ | Gr. liquid | (11) | 100 | | 52.8 | 52.8 | 9.2 | 9.1 | 5.9 | 6.1 | 10.5 | 10.4 | | |

[1] Melting points were taken using a mechanically stirred oil bath. They are corrected.
[2] Percent molybdenum: Calcd., 19.3; Found, 19.5.
[3] Percent tungsten: Calcd., 31.4; Found, 31.5.
[4] Percent arsenic: Calcd., 15.1; Found, 14.9.
[5] Percent antimony: Calcd., 22.3; Found, 22.3.
[6] Percent molybdenum: Calcd., 11.6; Found, 10.9.
[7] Percent molybdenum: Calcd., 8.6; Found, 9.4.
[8] Decomposes without distilling at 215°/0.5 mm.; $n_d^{26}=1.5417$.
[9] Percent nitrogen: Calcd., 10.9; Found, 10.9.
[10] Decomposes without distilling at 230°/0.1 mm.; $n_d^{25}=1.4893$.
[11] Decomposes without distilling at 230°/0.1 mm.
[12] C.=Crude; P=Pure.

*Infrared spectra.*—The spectra of 0.025 M solutions of these compounds are obtained on a Perkins-Elmer Model 21 recording spectrophotometer employing a cell thickness of 0.1 mm. For frequency values in the region 5000 to 1350 cm.$^{-1}$, carbon tetrachloride is used as the solvent; for those from 1350 to 640 cm.$^{-1}$, carbon disulfide. Because tris-(2-cyanoethyl)-phosphinechromium pentacarbonyl is not sufficiently soluble in these solvents, its spectrum is obtained in a tetrahydrofuran solution. The pertinent bands of the absorption spectra are listed in the following table:

TABLE II

| Compound | Wavelength in cm$^{-1}$ | | | | |
|---|---|---|---|---|---|
| $(C_6H_5)_3PCr(CO)_5$ | 2,066 m | 1,988 w | 1,942 v s | | 653 s. |
| $[(C_6H_5)_3P]_2Cr(CO)_4$ | 2,012 w | 1,949 w | 1,897 v s | | 653 m. |
| $(C_6H_5)_3PMo(CO)_5$ | 2,074 m | 1,988 w | 1,946 v s | | |
| $(C_6H_5)_3PW(CO)_5$ | 2,075 m | 1,980 sh | 1,938 v s | | |
| $(C_6H_5)_3AsCr(CO)_5$ | 2,066 m | 1,988 sh | 1,942 v s | | 653 m. |
| $(C_6H_5)_3SbCr(CO)_5$ | 2,065 m | 1,988 sh | 1,943 v s | | 653 m. |
| $(C_6H_5O)_3PCr(CO)_5$ | 2,080 m | 2,000 sh | 1,960 v s | | 651 m. |
| $[(C_6H_5O)_3P]_2Cr(CO)_4$ | 2,038 w | 1,976 w | 1,930 v s | | 666 m. |
| $[(C_6H_5O)_3P]_3Cr(CO)_3$ | 2,008 w | | 1,912 v s | | 647 m. |
| $[(C_6H_5O)_3P]_2Mo(CO)_4$ | 2,055 w | 1,990 m | 1,941 v s | | |
| $[(C_6H_5O)_3P]_3Mo(CO)_3$ | 2,020 w | | 1,923 v s | | |
| $(C_4H_9)_3PCr(CO)_5$ | 2,062 m | | 1,934 v s | 1,872 w | 655 m. |
| $(NCCH_2CH_2)_3PCr(CO)_5$ | 2,063 m | 1,988 sh | 1,938 v s | | 655 m. |
| $[(C_4H_9O)_3P]_2Cr(CO)_4$ | 2,024 w | 1,960 w | 1,906 v s | 1,872 s | 659 w. |
| $[(C_4H_9O)_3P]_3Cr(CO)_3$ | 2,028 w | 1,961 m | 1,908 s | 1,876 v s | 659 w. |
| $Cr(CO)_6$ | | | 1,980 v s | | 663. |
| $Mo(CO)_6$ | | | 1,980 v s | | |
| $W(CO)_6$ | | | 1,980 v s | | | v s=very strong.   s=strong.   w=weak.   m=medium.   sh=shoulder.

In order that those skilled in the art may more completely understand the present invention and the preferred methods by which the same may be carried into effect, the following specific examples are offered:

EXAMPLE 1
*Preparation of Triphenylphosphine Chromium Pentacarbonyl*

In a one-liter flask, equipped with a reflux condenser, thermometer and magnetic stirring apparatus, is placed 52.6 g. (0.20 mol) of triphenylphosphine, 50 g. (0.22 mol) of chromium hexacarbonyl and 500 ml. of diglyme.

Preparation of the desired $(C_6H_5)_3PCr(CO)_5$ is indicated by the following analysis:

| Element | Percent calculated | Percent actual |
|---|---|---|
| Carbon | 60.8 | 60.8 |
| Hydrogen | 3.3 | 3.3 |
| Chromium | 6.8 | 6.8 |
| Phosphorus | 11.45 | 11.3 |
| Molecular weight | 454 | 458 |

EXAMPLE 2

*Preparation of Triphenylphosphine Molybdenum Pentacarbonyl*

Into a one-liter flask, equipped with a reflux condenser, thermometer and magnetic stirring apparatus, is placed 66.0 g. (0.25 mol) of molybdenum hexacarbonyl, 52.4 g. (0.2 mol) of triphenylphosphine and 500 ml. of diglyme. The resultant mixture is heated with stirring at reflux (160° C.±2° C.) for two hours, allowed to cool, and filtered to separate excess molybdenum hexacarbonyl and some dark solid. The solvent is removed from the dark red filtrate under reduced pressure, the dark solid residue, weighing 91 g. (—5 g.) is dissolved in a hot mixture of 175 ml. chloroform and 75 ml. of ethanol and treated with charcoal, filtered while hot and the filtrate (dark brown) chilled after addition of 75 ml. of cold ethanol. The mixture is filtered to obtain 73 g. of white solid. The still-wet solid is dissolved in 100 ml. chloroform and 75 ml. of ethanol (hot), filtered while hot into a heated receiver, and the filter washed with about 30 ml. hot ethanol. The filtrate is then allowed to cool slowly. The cooled material is filtered to yield 57 g. white crystalline solid, M.P. 138–9° C. Preparation of the desired $(C_6H_5)_3PMo(CO)_5$ is indicated by the following elemental analysis:

| Element | Percent calculated | Percent actual |
| --- | --- | --- |
| Carbon | 55.5 | 55.6 |
| Hydrogen | 3.0 | 3.0 |
| Molybdenum | 19.3 | 19.5 |
| Phosphorus | 6.2 | 5.7 |
| Molecular weight | 498 | 495 |

EXAMPLE 3

*Preparation of Triphenylphosphine Tungsten Pentacarbonyl*

Using the general procedure of the preceding example, 17.6 g. (0.5 mol) of tungsten hexacarbonyl, 12.8 g. (0.49 mol) of triphenylphosphine, and 250 ml. of diglyme are mixed and heated under reflux (163° C.) for two hours. The resulting solution turns dark brown after about an hour's heating. The reaction mixture is allowed to stand overnight, then filtered and the clear dark brown filtrate stripped of solvent under reduced pressure at about a temperature of 80° C. There is thus separated 24.5 g. of a dirty white solid which is dissolved in 50 ml. of chloroform with heating, the solution filtered and 50 ml. absolute ethanol added to the filtrate. On standing a solid crystallizes which is filtered and washed with 50 ml. of ethanol to obtain 16.5 g. of a pale tan crystalline solid melting at 147°–149° C. These crystals are dissolved in 25 ml. of warm chloroform, the solution diluted with 25 ml. of absolute ethanol and allowed to cool to room temperature. Long prismatic crystals form which are separated by filtration and weigh 12.3 g., melting point 146°–147° C. Preparation of the desired $(C_6H_5)_3PW(CO)_5$ is indicated by the following elemental analysis:

| Element | Percent calculated | Percent actual |
| --- | --- | --- |
| Carbon | 47.2 | 47.0 |
| Hydrogen | 2.6 | 2.7 |
| Phosphorus | 5.3 | 5.0 |
| Tungsten | 31.4 | 31.5 |
| Molecular weight | 586 | 593 |

EXAMPLE 4

*Preparation of Tris(2-Cyanoethyl)Phosphine Chromium Pentacarbonyl*

Using the general procedure of the foregoing examples, there are combined 10 g. (0.05 mol) tris(2-cyanoethyl)phosphine, 25 g. (0.11 mol) chromium hexacarbonyl and 500 ml. of diglyme. This mixture is refluxed for six hours during which time a clear yellow solution is formed which gradually turns orange, then to a murky green-brown slurry. This slurry is filtered to remove excess chromium hexacarbonyl and some green powder, and the resultant clear brown solution is stripped of solvent under reduced pressure at 100° C. A brown yellow solid remains. This product is recrystallized several times from a mixture of tetrahydrofuran and ethanol to obtain a white crystalline solid which melts at 136°–137° C.

The following analytical data indicated preparation of the desired $(NCCH_2CH_2)_3PCr(CO)_5$.

| Element | Percent calculated | Percent actual |
| --- | --- | --- |
| Carbon | 43.7 | 43.8 |
| Hydrogen | 3.1 | 3.0 |
| Nitrogen | 10.9 | 10.9 |
| Phosphorus | 8.05 | 7.7 |
| Chromium | 13.5 | 13.3 |

EXAMPLE 5

*Preparation of Triphenyl Phosphite Chromium Pentacarbonyl*

A mixture of 62 g. (0.20 mol) triphenyl phosphite and 50 g. (0.22 mol) chromium hexacarbonyl in 500 ml. of diglyme is refluxed for four hours whereupon a green mixture is formed. The mixture is filtered to remove some green solid and a filtrate consisting of an almost colorless liquid and a green layer is evaporated under reduced pressure at 100° C. to give a viscous green liquid mixture. The colorless portion is decanted from the heavy green layer, weighing 55 g., dissolved in a warm mixture of chloroform and ethanol, and filtered. On cooling, white crystals formed which on filtration and washing with cold ethanol yielded crystals melting at 59.5°–60.0° C.

Preparation of the desired $(C_6H_5O)_3PCr(CO)_5$ is indicated by the following elemental analysis:

| Element | Percent calculated | Percent actual |
| --- | --- | --- |
| Carbon | 55.0 | 55.0 |
| Hydrogen | 3.0 | 3.1 |
| Phosphorus | 6.2 | 6.2 |
| Chromium | 10.3 | 10.2 |
| Molecular weight | 502 | 495 |

EXAMPLE 6

*Preparation of Bis(Triphenyl Phosphite)Chromium Tetracarbonyl*

In a 2-liter, 3-necked flask equipped with a reflux condenser are placed 132 g. (0.6 mol) of chromium hexacarbonyl 465 g. (1.5 mol) of triphenyl phosphite and 750 ml. of diglyme. The mixture is heated at reflux for five hours. Chromium hexacarbonyl which sublimed up the condenser is returned to the flask by means of a wire through the condenser. After about 1½ hours of heating, all the $Cr(CO)_6$ has been consumed, leaving the reaction mixture a clear yellow solution. At the conclusion of the heating period, the reaction mixture is allowed to cool to room temperature and stand overnight. During the overnight standing, crystals form, which are separated by filtration, washed with absolute ethanol and dried to give 320 g. of white crystals, M.P. 149°–150°C. Evaporation of the filtrate under reduced pressure gives an oil. Treatment of this oil with absolute ethanol yields an additional 81 g. of white solid, M.P. 143°–147° C. Total crude yield is 89%.

Both fractions are recrystallized separately by dissolving them in hot chloroform (approximately 1 ml. per g. of solid), filtering, adding absolute ethanol to the filtrate and allowing it to stand at room temperature. In this way is obtained 313 g. (67%) of snow white microcrystals, M.P. 148°–149° C. These are shown, by mixed melting point and infrared spectrum, to be identical with an earlier prepared sample which is the desired $$[(C_6H_5O)_3P]_2Cr(CO)_4$$

as shown by the following elemental analysis:

| Element | Percent calculated | Percent actual |
|---|---|---|
| Carbon | 61.2 | 60.8 |
| Hydrogen | 3.8 | 4.0 |
| Phosphorus | 7.9 | 7.8 |
| Chromium | 6.6 | 6.6 |

EXAMPLE 7

*Preparation of Tris(Triphenyl Phosphite)Chromium Tricarbonyl*

In a 500 ml. flask equipped with a reflux condenser, thermometer and magnetic stirring apparatus is placed 11 g. (0.05 mol) of benzene chromium tricarbonyl, 62 g. (0.2 mol) of triphenyl phosphite and 250 ml. of diglyme. The resulting solution is heated with stirring at reflux (about 160° C.) for eight hours. A murky green-yellow color developed and on cooling and filtering a green-yellow solution is obtained. The solvent is removed under reduced pressure at 100° C. to give 48 g. of a green-yellow viscous solid. Crystallization from chloroform-methanol (50 ml. of each) yields a yellow crystalline solid (40 g.). Repeated recrystallization from chloroform-ethanol gives 8 g. of white crystals, melting at 126°–126.5° C. shown by elemental analysis to have the composition $[P(OC_6H_5)_3]_3Cr(CO)_3$.

| Element | Percent calculated | Percent actual |
|---|---|---|
| Carbon | 64.2 | 64.4 |
| Hydrogen | 4.2 | 4.6 |
| Chromium | 8.7 | 8.2 |
| Phosphorus | 4.9 | 5.0 |

EXAMPLE 8

*Preparation of Bis(Tri-n-Butyl Phosphite)Chromium Tetracarbonyl*

A mixture of 22 g. (0.10 mol) chromium hexacarbonyl, 150 g. (0.60 mol) tri-n-butyl phosphite and 500 ml. of diglyme are refluxed at 165° C. using a magnetic stirrer for agitation for six hours. A clear yellow-green solution is formed. The resultant yellow-green solution is filtered and evaporated at 1 mm. Hg at 100° C. The diglyme is removed leaving a pale green-yellow solution. This solution is further evaporated at 150° C. and 0.2 mm. Hg to remove unreacted tri-n-butyl phosphite. About 70 g. of pale green liquid remains, which is further evaporated at 230° C. and 0.10 mm. Hg pressure, causing some decomposition. The pale green liquid did not distill under these conditions and was assumed to be a homogeneous compound, since unreacted starting material had been removed.

Preparation of the desired $[(C_4H_9O)_3P]_2Cr(CO)_4$ is indicated by the following elemental analysis:

| Element | Percent calculated | Percent actual |
|---|---|---|
| Carbon | 50.6 | 51.3 |
| Hydrogen | 8.1 | 9.2 |
| Phosphorus | 9.3 | 9.4 |
| Chromium | 7.8 | 8.2 |
| Molecular weight | 664 | 670 |

EXAMPLE 9

*Preparation of Triphenylarsine Chromium Pentacarbonyl*

In a liter flask equipped with a reflux condenser, thermometer and magnetic stirring apparatus is placed 15.3 g. of triphenylarsine (0.05 mol), 55 g. of chromium hexacarbonyl (0.25 mol) and 500 ml. of diglyme. The resulting mixture is heated with stirring at reflux for twenty hours, allowed to cool, and filtered to remove unreacted chromium hexacarbonyl and some insoluble green solid. The solvent is removed from the green filtrate under reduced pressure at 100° C. to give a dark green solid mass, 18 g., which is recrystallized from chloroform-ethanol several times to give 11 g. of yellow crystals, M.P. 135°–135.5° C. The product is shown to have the structure $[As(C_6H_5)_3]Cr(CO)_5$ by elemental analysis:

| Element | Percent calculated | Percent actual |
|---|---|---|
| Carbon | 55.4 | 55.4 |
| Hydrogen | 3.0 | 3.0 |
| Chromium | 10.45 | 9.3 |
| Arsenic | 15.1 | 14.9 |

EXAMPLE 10

*Preparation of 1,2,4-Trimethylbenzene Chromium Tricarbonyl*

A mixture of 5.5 g. (0.025 mol) of chromium hexacarbonyl, 6 g. (0.05 mol) of 1,2,4-trimethylbenzene and 50 ml. of diglyme is heated under reflux for a total of seven hours. During the heating period, the chromium hexacarbonyl which sublimes up the condenser is returned to the reaction flask by means of a copper wire ramrod inserted through the condenser. The reaction mixture is allowed to cool to room temperature, filtered, and the filtrate chilled in a refrigerator overnight. Since the product did not crystallize during this cooling, the solvent and excess 1,2,4-trimethylbenzene are removed under reduced pressure to give 5.2 g. of pale green solid residue. Two recrystallizations from pentane yield 3.3 g. of bright yellow needles, M.P. 49°–50° C. This is the desired $1,2,4-(CH_3)_3(C_6H_3)Cr(CO)_3$ as shown by the following elemental analysis:

| Element | Percent calculated | Percent actual |
|---|---|---|
| Carbon | 56.2 | 56.8 |
| Hydrogen | 4.7 | 5.1 |
| Chromium | 20.3 | 20.5 |

EXAMPLE 11

*Preparation of 1,2,4,5-Tetramethylbenzene Chromium Tricarbonyl*

Following the procedure described in the preceding example, 5.5 g. (0.025 mol) of chromium hexacarbonyl, 6.7 g. (0.05 mol) of 1,2,4,5-tetramethylbenzene, and 50 ml. of diglyme are refluxed together for ten hours. The hot solution is filtered and the solvent removed by distillation under reduced pressure. Recrystallization of the solid residue from pentane yields 1.5 g. of bright yellow small crystals, M.P. 98°–99° C. This is the desired $1,2,4,5-(CH_3)_4(C_6H_2)Cr(CO)_3$ as shown by the following elemental analysis:

| Element | Percent calculated | Percent actual |
|---|---|---|
| Carbon | 57.8 | 57.8 |
| Hydrogen | 5.2 | 5.3 |
| Chromium | 17.8 | 18.8 |

EXAMPLE 12

*Preparation of 1,3,5-Triisopropylbenzene Chromium Tricarbonyl*

Following the procedure of the preceding example, 5.5 g. (0.025 mol) of chromium hexacarbonyl, 10.2 g. (0.05 mol) of 1,3,5-triisopropylbenzene, and 50 ml. of diglyme are refluxed together for a total of twelve hours. The solution is filtered while hot and the solvent removed by distillation under reduced pressure. The yellow solid residue is recrystallized from a 1:1 carbon tetrachloride-pentane mixture to yield 0.8 g. of pale yellow solid, M.P. 116°–117° C. This is the desired $$1,3,5-[(CH_3)_2CH]_3(C_6H_3)Cr(CO)_3$$

as shown by the following elemental analysis:

| Element | Percent calculated | Percent actual |
|---|---|---|
| Carbon | 63.5 | 63.2 |
| Hydrogen | 7.1 | 7.2 |
| Chromium | 15.3 | 14.9 |

EXAMPLE 13

*Preparation of Benzene Chromium Tricarbonyl*

A one-liter stirred autoclave is charged with 44 g. (0.2 mol) of chromium hexacarbonyl and 300 ml. of benzene. After thorough flushing with nitrogen, the autoclave is sealed and heated, with stirring, at 220° C.±5° C. for three hours. The pressure rises to 350–400 p.s.i. during the heating period. The autoclave is allowed to cool to room temperature, opened, and the contents filtered. The benzene is removed from the clear yellow filtrate under reduced pressure to give 23.5 g. of yellow solid. This was recrystallized from chloroform-ethanol to give 16 g. of yellow crystals, M.P. 163°–164° C.

EXAMPLE 14

*Preparation of Triphenylarsine-Chromium Pentacarbonyl*

In a 1-liter, 3-necked flask equipped with a reflux condenser and a magnetic stirrer is placed 44 g. (0.2 mol) of $Cr(CO)_6$, 55 g. (0.18 mol) of triphenylarsine and 500 ml. of diglyme. The solution is heated to reflux (ca. 165° C.) for three hours, during which time $Cr(CO)_6$ which sublimed is returned to the flask mechanically. After cooling to room temperature and filtering, the diglyme is removed by distillation under reduced pressure. The solid residue is recrystallized from a mixture of chloroform-ethanol to yield 50 g. (55%) of yellow crystals, $(C_6H_5)_3AsCr(CO)_5$, M.P. 135°–135.5 C.

*Analysis.*—Calcd. for $C_{23}H_{15}O_5AsCr$: C, 55.4; H, 3.0; Cr, 10.4; As, 15.1. Found: C, 55.4; H, 3.0; Cr, 9.3; As, 14.9.

EXAMPLE 15

*Preparation of Triphenylstibine Chromium Pentacarbonyl*

The procedure described in Example 14 is followed using 44 g. (0.2 mole) of $Cr(CO)_6$ and 70.6 g. (0.2 mole) of triphenylstibine. The product, 23 g. (21%), is a bright yellow solid $(C_6H_5)_3SbCr(CO)_5$, M.P. 147–149° C.

*Analysis.*—Calcd. for $C_{23}H_{15}O_5SbCr$: C, 50.7; H, 2.8; Cr, 9.5; Sb, 22.3. Found: C, 50.6; H, 2.7; Cr, 9.3; Sb, 22.3.

EXAMPLE 16

*Preparation of Bis(Triphenylphosphite)-Molybdenum Tetracarbonyl*

A mixture of 29.2 g. (0.11 mole) of $Mo(CO)_6$ and 65.0 g. (0.21 mole) of $(C_6H_5O)_3P$ is refluxed in diglyme for three hours. After cooling, filtering and removing the solvent, under reduced pressure, a white solid residue which weighs 84 g. (97%) is obtained. This is recrystallized from a mixture of chloroform and ethanol to give 28 g. (32%) of white crystals, $[(C_6H_5O)_3P]_2Mo(CO)_4$, M.P. 110–111° C.

*Analysis.*—Calcd. for $C_{40}H_{30}MoP_2O_{10}$: C, 58.0; H, 3.7; Mo, 11.6; P, 7.5. Found: C, 57.7; H, 3.7; Mo, 10.9; P, 7.2.

EXAMPLE 17

*Preparation of Tris-(Triphenylphosphite)-Molybdenum Tricarbonyl*

The procedure of Example 16 above is followed using 22 g. (0.1 mole) of $Cr(CO)_6$ and 186 g. (0.6 mole) of $(C_6H_5O)_3P$. The residue after distillation of the solvent is a liquid. On standing in an evaporating dish, a portion of this slowly solidifies to give 66 g. (59%) of a white solid. Recrystallization from a mixture of chloroform and ethanol gives 12 g. (11%) of a white solid, $[(C_6H_5O)_3P]_3Mo(CO)_3$, M.P. 142–143° C.

*Analysis.*—Calcd. for $C_{57}H_{45}MoP_3O_{12}$: C, 61.6; H, 4.0; P, 8.4; Mo, 8.7. Found: C, 61.4; H, 3.7; P, 8.7; Mo, 9.4.

EXAMPLE 18

*Preparation of Tributylphosphine Chromium Pentacarbonyl*

A mixture of 24.2 g. (0.11 mol) of $Cr(CO)_6$ and 20.2 g. (0.1 mol) of $(C_4H_9)_3P$ is heated under reflux in diglyme for four hours. The reactants are kept under nitrogen atmosphere during the entire period due to the pyrophoric nature of the phosphine. Distillation of the solvent under reduced pressure leaves a green liquid residue in quantitative yield. This liquid decomposes without distilling at 220° C./0.05 mm. Hg. The liquid is dissolved in chloroform, filtered and stripped of all volatile material under high vacuum. The resulting yellow-green liquid residue $(C_4H_9)_3PCr(CO)_5$ weighs 13.4 g. (34%). It has a refractive index $n_D^{26}$ of 1.5417.

*Analysis.*—Calcd. for $C_{17}H_{27}CrPO_5$: C, 51.8; H, 6.9; Cr, 13.2; P, 7.9. Found: C, 51.5; H, 7.2; Cr, 12.9; P, 7.5.

EXAMPLE 19

*Preparation of Tris(Tributylphosphite) Chromium Tricarbonyl*

A mixture of 9 g. (0.033 mol) of durene-chromium tricarbonyl and 33 g. (0.13 mol) of tributylphosphite is heated at 170–180° C. for three hours and then at 200° C. for one hour. The excess $(C_4H_9O)_3P$ is removed by distillation under reduced pressure and the residue filtered to yield 19 g. (65%) of a clear green liquid, $$[(C_4H_9O)_3P]_3Cr(CO)_3$$

*Analysis.*—Calcd. for $C_{39}H_{81}CrP_3O_{12}$: C, 52.8; H, 9.2; Cr, 5.9; P, 10.5. Found: C, 52.8; H, 9.1; Cr, 6.2; P, 10.5.

EXAMPLE 20

*Preparation of Bis-(Triphenylphosphine)-Chromium Tetracarbonyl*

A flask equipped with a reflux condenser and magnetic stirrer is charged with a solution of 44 g. (0.1 mol) of triphenylphosphinechromium pentacarbonyl and 52 g. (0.2 mol) of triphenylphosphine in ca. 300 ml. of diglyme. The solution is heated at 158° C. for 1.5 hours, cooled, filtered and the solvent removed by distillation under reduced pressure. Recrystallization of the solid residue from chloroform-ethanol gives 8.3 g. (12%) of yellow crystals, $[(C_6H_5)_3P]_2Cr(CO)_4$, M.P. 250°–253° C. (sealed tube).

*Analysis.*—Calcd. for $C_{40}H_{30}O_4P_2Cr$: C, 69.7; H, 4.4; P, 9.0; Cr, 7.5. Found: C, 68.5; H, 4.4; P, 9.2; Cr, 7.8.

EXAMPLE 21

*Preparation of Bis(Triphenylphosphine)-Molybdenum Tetracarbonyl*

Following the procedure of Example 16, a mixture of $Mo(CO)_6$ and $(C_6H_5)_3P$ is refluxed in diglyme for thirteen hours. A 76% yield of crude material is obtained which when recrystallized from benzene yields 35% of pure $[(C_6H_5)_3P]_2Mo(CO)_4$.

*Analysis.*—Calcd. for $C_{40}H_{30}MoP_2O_4$: C, 65.6; H, 4.11; Mo, 13.1; P, 8.46. Found: C, 65.7; H, 4.4; Mo, 10.7; P, 7.81.

EXAMPLE 22

To demonstrate bactericidal activity of compounds of this invention, the below-noted compounds are each mixed with distilled water containing 5% acetone and 0.01% Triton X-155 (alkyl aryl polyether alcohol), at a concentration of 250 p.p.m. 5 ml. of such a test formulation of each compound are put in each of four test tubes. To each test tube is then added one of the organisms: *Erwinia amylovora, Xanthomonas phaseoli, Staphylococcus aureus* and *Escherichia coli* in the form of a bacterial suspension in a saline solution from potato-dextrose agar plates. The tubes are then incubated for 4 hours at 30° C. Transfers are then made to sterile broth with a standard 4 mm. loop and the thus-innoculated broth is incubated for 48 hours at 37° C. Using this procedure, the following results are obtained:

[Percent kill @ 250 p.p.m.]

| Compound | E. coli | S. aureus | E. amylovora | X. phaseoli |
|---|---|---|---|---|
| $[(C_6H_5O)_3P]Cr(CO)_5$ | 75 | | | |
| $(C_6H_6)Cr(CO)_3$ | 100 | 100 | 100 | 100 |
| $1,2,4,5-(CH_3)_4(C_6H_2)Cr(CO)_3$ | 57 | | | 51 |
| $1,2,4-(CH_3)_3(C_6H_3)Cr(CO)_3$ | 87 | 43 | 70 | 100 |
| $[(C_6H_5O)_3P]_2Mo(CO)_4$ | | | | 55 |
| $(C_4H_9O)_3PCr(CO)_5$ | 80 | | | 70 |
| $[(C_4H_9O)_3P]_3Cr(CO)_3$ | 50 | | 81 | |
| $[(C_6H_5)_3P]_2Mo(CO)_4$ | 100 | 53 | 66 | 100 |

EXAMPLE 23

In order to illustrate insecticidal activity of compounds of this invention, male German cockroaches, *Blatella germanica*, 8 to 9 weeks old, are anaesthetized with carbon dioxide to facilitate handling and then dipped in a test formulation (2000 p.p.m., 1000 p.p.m. or 500 p.p.m. chemical of this invention, 5% acetone–0.01% Triton X-155—balance water) for 10 seconds, removed and freed of excess liquid, and caged. Two lots of 10 insects each are exposed to this formulation and mortality observations are recorded after three days. Using this procedure, the following mortality ratings are observed:

| Compound | Percent roach kill— | | |
|---|---|---|---|
| | At 2,000 p.p.m. | At 1,000 p.p.m. | At 500 p.p.m. |
| $[(C_4H_9O)_3P]_2Cr(CO)_4$ | 100 | 95 | 85 |
| $1,2,4-(CH_3)_3(C_6H_3)Cr(CO)_3$ | 100 | | |
| $(C_6H_6)Cr(CO)_3$ | 100 | | |
| $[(C_4H_9O)_3P]_3Cr(CO)_3$ | 90 | 85 | |

EXAMPLE 24

Fourth instar larvae of the Mexican bean beetle, *Epilachna varivestis*, less than one day old within the instar, are employed. Paired seed leaves, excised from Tendergreen beam plants, are dipped in a formulation of the test chemicals (2000 p.p.m. of $(C_6H_5)_3PMo(CO)_5$, 5% acetone—0.01% Triton X-155—balance water) (and, separately in same type of formulation

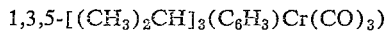

$1,3,5-[(CH_3)_2CH]_3(C_6H_3)Cr(CO)_3)$ until they are thoroughly wetted. The chemical deposit on the leaf is then dried and the paired leaves are separated. Each is placed in a 9 cm. Petri dish with a filter paper liner, and ten randomly selected larvae are introduced before the dish is closed. After three days' exposure, the following results are observed.

| Compound: | Percent kill |
|---|---|
| $(C_6H_5)_3PMo(CO)_5$ | 80 |
| $1,3,5-[(CH_3)_2CH]_3(C_6H_3)Cr(CO)_3$ | 55 |

EXAMPLE 25

A tomato foliage disease test is conducted illustrating the ability of the compounds of this invention to protect tomato foliage against infection by the early blight fungus *Alternaria solani* and late blight fungus *Phytophthora infestans*. Tomato plants 5 to 7 inches high of the variety Bonny Best are employed. The plants are sprayed with 100 ml. of test formulation at 2000 p.p.m. or other indicated concentration (2000 p.p.m. test chemical, 5% acetone—0.01% Triton X-155—balance water) at 40 lbs. air pressure while being rotated on a turntable in a spray chamber. After the spray deposit is dry, the treated plants and comparable untreated controls are sprayed with a spore suspension containing approximately 20,000 conidia of *A. solani* per ml. and in separate tests with a spore suspension containing 150,000 sporangia of *P. infestans* per ml. The plants are held in a 100% humid atmosphere for 24 hours at 70° F. to permit spore germination and infection. After 2 to 4 days, lesion counts are made on the three uppermost fully expanded leaves. Data based on the number of lesions obtained on the control plants indicate the following results:

| Compound | E. blight | L. blight |
|---|---|---|
| $1,2,4-(CH_3)_3(C_6H_3)Cr(CO)_3$ | 93 at 2,000 p.p.m. | |
| $1,2,4,5-(CH)(CH)Cr(CO)$ | 100 at 512 p.p.m. | 82 at 400 p.p.m. |
| | 95 at 400 p.p.m. | |
| $(C_6H_6)Cr(CO)_3$ | 100 at 2,000 p.p.m. | 95 at 2000 p.p.m. |
| $[(C_4H_9O)_3P]_3Cr(CO)_3$ | | 83 at 2000 p.p.m. |

EXAMPLE 26

PART A

In order to illustrate the use of compounds of this invention as nematocides, non-plant parasite nematodes (*Panagrellus redivivus*) are exposed to the test chemicals in small watch glasses, (27 mm. diameter × 8 mm. deep), within a 9 cm. Petri dish. 0.4 ml. of an aqueous test formulation (100 p.p.m. test chemical, 5% acetone—0.01% Triton X-155—balance water) and 0.1 ml. of a Panagrellus suspension are used. Results are recorded 48 hours after treatment. Fumigant nematocidal activity is indicated by placing one watch glass containing only water and the test organism within the same Petri dish.

| Compound | Percent nematode kill | |
|---|---|---|
| | Contact | Fumigant |
| $1,3,5-[(CH)_2CH]_3(C_6H_3)Cr(CO)_3$ | 100 | 100 |
| $1,2,4-(CH_3)_3(C_6H_3)Cr(CO)_3$ | 68 | |

PART B

Composted green house soil diluted one-third with clean washed sand is placed in ½ gallon glazed crocks and infested with 3 to 5 g. of knotted or galled tomato roots. Nematocidal treatment against the Meloidogyne sp. is effected by mixing intimately with the soil 1,2,4,5-tetramethylbenzene chromium tricarbonyl at the rate of 256 lbs. per acre. (384 mg. in ½ gallon crock based on surface area of filled crock). A 90% nematode kill is observed.

In addition to the general method previously disclosed in some detail herein involving the reaction of chromium hexacarbonyl, it will also be appreciated that compounds of this invention can be prepared using an aryl chromium tricarbonyl as a reactant with a trivalent metal compound of the group V(A) metals such as triphenyl phosphite, typically at reflux temperature using stoichiometric proportions and a high boiling solvent such as diglyme, i.e., bis(2-methoxyethyl) ether. While the proportions of the reactants used in preparing compounds of this invention can be varied somewhat, it generally is desirable to use substantially stoichiometric quantities.

By the practice of this invention, it is possible, using an unsubstituted carbonyl-containing reactant, for example, to displace one or more carbonyl groups with the trivalent radical. Moreover, using an aromatic radical substituted carbonyl compound either aromatic radicals or carbonyl radicals, or both, can be displaced by trivalent radicals. Using a compound such as a carbonyl compound substituted with a substituted trivalent compound selected from the group consisting of phosphorus, arsenic, antimony and bismuth, either the substituted trivalent compound or the carbonyl radical, or both, can be displaced by the trivalent radical. Reactions of the foregoing type are indicated as follows:

(1) 
$Cr(CO)_6 + PR_3 \rightarrow R_3PCr(CO)_5 + CO$ (2) 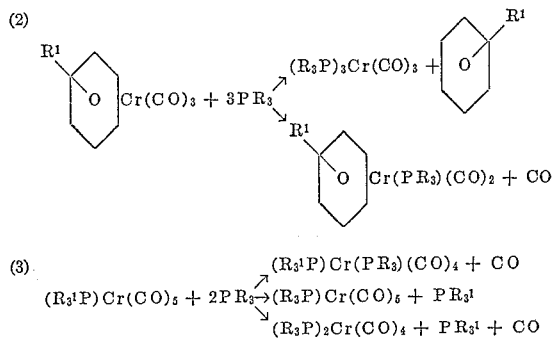

(3)
$(R_3^1P)Cr(CO)_5 + 2PR_3 \rightarrow \begin{matrix} (R_3^1P)Cr(PR_3)(CO)_4 + CO \\ (R_3P)Cr(CO)_5 + PR_3^1 \\ (R_3P)_2Cr(CO)_4 + PR_3^1 + CO \end{matrix}$ where the phosphorus moeities $PR_3$ and $PR_3^1$ and the chromium moeities can be replaced by other radicals of the types described hereinbefore.

EXAMPLE 27

Preparation of Complexes

PART A

*Triphenylphosphine-chromium pentacarbonyl.*—A mixture of 52.6 g. (0.2 mol) of triphenylphosphine, 50 g. (0.23 mol) of chromrium hexacarbonyl and 500 ml. of diglyme is heated to reflux for four hours. The hexacarbonyl, which sublimed into the condenser throughout the reaction, is returned to the reaction vessel intermittently by means of a copper wire ramrod. The reaction mixture is allowed to cool, filtered and the solvent removed by distillation under reduced pressure to give 76 g. (84%) of green-yellow crystals. These are recrystallized three times from a mixture of chloroform and ethanol. The resulting pale yellow crystals weigh 28 g. (31%) and melt at 127–128° C.

*Analysis.*—Calcd. for $C_{23}H_{15}PCrO_5$: C, 60.8; H, 3.3; Cr, 11.5; P, 6.8; M. wt., 454. Found: C, 60.8; H, 3.3; Cr, 11.3; P, 6.8; M. wt., 458.

PART B

*Tris-triphenylphosphite-chromium tricarbonyl.*—The reaction of 27 g. (0.1 mole) of durene-chromium tricarbonyl and 310 g. (1.0 mole) of triphenylphosphite is carried out by heating the mixture at 240° C. for one and a half hours, during which time durene is observed to sublime into the condenser. The green liquid reaction product is dissolved in chloroform, filtered and placed in an evaporating dish. After the chloroform has evaporated, the excess triphenylphosphite is decanted. Filtration of the residue yields 74 g. (69%) of green tinted white crystals. Two recrystallizations from chloroform-ethanol give 32 g. (30%) of white crystals, M.P. 126–126.5° C. These are sensitive to light and undergo slow decomposition unless stored in the dark.

*Analysis.*—Calcd. for $C_{57}H_{45}P_3CrO_{12}$: C, 64.2; H, 4.2; Cr, 4.9; P, 8.7. Found: C, 64.4; H, 4.6; Cr, 5.0; P, 8.2.

PART C

*Displacement reactions.*—The general procedure consists of dissolving 0.0025 mole of the complex together with the appropriate stoichiometric amount of displacing ligand in 50 ml. of diglyme and heating the solution at 130° C. Two milliliter samples are withdrawn at intervals of 0, 30, 60, 120 and 180 minutes. Their infrared spectra are recorded on the same chart with minimum delay. The presence of reaction is indicated by the shift, appearance or disappearance of bands using the spectra of the pure complexes as references to guide the interpretation. The following combinations are employed:

(1) $(C_6H_5)_3PCr(CO)_5 + (C_6H_5O)_3P$
(2) $(C_6H_5)_3PCr(CO)_5 + 2(C_6H_5O)_3P$
(3) $(C_6H_5)_3PCr(CO)_5 + (C_4H_9O)_3P$
(4) $(C_6H_5)_3PCr(CO)_5 + 2(C_4H_9O)_3P$
(5) $(C_6H_5O)_3PCr(CO)_5 + (C_4H_9O)_3P$
(6) $(C_6H_5O)_3PCr(CO)_5 + 2(C_4H_9O)_3P$
(7) $[(C_6H_5O)_3P]_2Cr(CO)_4 + 2(C_6H_5)_3P$
(8) $[(C_6H_5O)_3P]_2Cr(CO)_4 + (C_4H_9O)_3P$
(9) $[(C_6H_5O)_3P]_2Cr(CO)_4 + 2(C_4H_9O)_3P$
(10) $[(C_4H_9O)_3P]_2Cr(CO)_4 + 2(C_6H_5O)_3P$
(11) $(C_4H_9)_3PCr(CO)_5 + 2(C_4H_9O)_3P$
(12) $(C_4H_9)_3PCr(CO)_5 + 2(C_6H_5O)_3P$
(13) $(C_4H_9)_3PCr(CO)_5 + (C_6H_5)_3P$
(14) $(C_6H_5)_3PCr(CO)_5 + Mo(CO)_6$
(15) $(C_6H_5)_3PMo(CO)_5 + Cr(CO)_6$
(16) $Durene-Cr(CO)_3 + 3(C_6H_5O)_3P$
(17) $[(C_6H_5O)_3P]_3Cr(CO)_3 + durene$ While compounds of this invention may be employed in a variety of applications, biological or otherwise, when employed as biologically-active materials, it will be understood of course, that such compounds may be utilized in diverse formulations, both liquid and solid, including finely-divided powders and granular materials, as well as liquids, such as solutions, concentrates, emulsifiable concentrates, slurries, and the like, depending upon the application intended and the formulation media desired.

These compounds may be used alone or in combination with other known biologically-active materials, such as other organic phosphates, pesticides, chlorinated hydrocarbons, insecticides, foliage and soil fungicides, pre- and post-emergent herbicides, and the like.

Thus, it will be appreciated that compounds of this invention may be employed to form biologically-active substances containing such compounds as essential active ingredients thereof, which compositions may also include finely-divided dry or liquid diluents, extenders, fillers, conditioners, including various clays, diatomaceous earth, talc, spent catalyst, alumina-silica materials, liquids, solvents, diluents, or the like, including water and various organic liquids, such as benzene, toluene, chlorinated benzene, acetone, cyclohexanone, xylene, carbon disulfide, carbon tetrachloride, and various mixtures thereof.

When liquid formulations are employed or dry materials prepared which are to be used in liquid form, it is desirable in certain instances additionally to employ a wetting, emulsifying, or dispersing agent to facilitate use of the formulation, e.g., Triton X–155(alkyl aryl polyether alcohol, U.S. Patent No. 2,504,064). Suitable surface active agents are set forth in an article by John W. McCutcheon in "Soap and Chemical Specialties," vol. 31, pages 7–10 (1955).

The term "carrier" as employed in the specification and claims is intended to refer broadly to the materials constituting a major proportion of a biologically-active material or other formulation and hence includes finely-divided materials, both liquids and solids, as aforementioned, conventionally used in such applications.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of preparing a compound having the formula

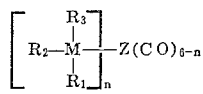

wherein M is an element selected from the group consisting of phosphorus, arsenic, antimony and bismuth, Z is a metal selected from the group consisting of chromium, molybdenum, tungsten and uranium, $n$ is a number from 1 to 5, inclusive, $R_1$, $R_2$, and $R_3$ are radicals independently selected from the group consisting of hydrogen, halogen, alkyl, aryl, alkoxy and aryloxy radicals, which comprises chemically reacting a compound of a trivalent element selected from the group consisting of phosphorus, arsenic, antimony and bismuth and a compound of a zerovalent metal of group VI(B) of the periodic table by refluxing said compounds in a solvent having a boiling point at atmospheric pressure of at least about 100° C.

2. The method according to claim 1 wherein the solvent is a high boiling ether.

3. The method according to claim 1 wherein the solvent is bis(2-ethoxyethyl)ether.

4. The method according to claim 1 wherein the solvent is dibutyl Carbitol.

5. The method according to claim 1 wherein the solvent is trimethylene glycol.

6. The method according to claim 1 wherein the solvent is bis(2-methoxyethyl)ether.

7. The method according to claim 1 wherein the solvent is tetrahydrofuran.

8. The method according to claim 1 wherein the reaction temperature is maintained within the range from about 60° to 170° C. for about ½ to 8 hours.

9. A compound having the formula

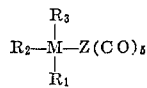

wherein M is an element selected from the group consisting of phosphorus, arsenic, antimony and bismuth, Z is a metal selected from the group consisting of chromium, molybdenum, tungsten and uranium, and $R_1$, $R_2$, and $R_3$ are radicals independently selected from the group consisting of hydrogen, halogen, alkyl, aryl, alkoxy and aryloxy radicals.

10. A compound having the formula

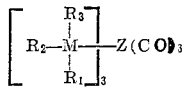

wherein M is an element selected from the group consisting of phosphorus, arsenic, antimony and bismuth, Z is a metal selected from the group consisting of chromium, molybdenum, tungsten and uranium, and $R_1$, $R_2$, and $R_3$ are radicals independently selected from the group consisting of hydrogen, halogen, alkyl, aryl, alkoxy and aryloxy radicals.

11. A compound having the formula

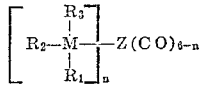

wherein M is an element selected from the group consisting of phosphorus, arsenic, antimony and bismuth, Z is a metal selected from the group consisting of chromium, molybdenum, tungsten and uranium, $n$ is a number from 1 to 5, inclusive, $R_1$, $R_2$, and $R_3$ are alkoxy radicals.

12. A compound according to claim 11 wherein M is phosphorus.

13. A compound according to claim 11 wherein M is arsenic.

14. A compound according to claim 11 wherein M is antimony.

15. A compound according to claim 11 wherein M is bismuth.

16. A compound according to claim 11 wherein Z is chromium.

17. A compound according to claim 11 wherein Z is molybdenum.

18. A compound according to claim 11 wherein Z is tungsten.

19. A compound according to claim 11 wherein Z is uranium.

20. A compound according to claim 11 wherein M is phosphorus and Z is chromium.

21. A compound having the formula

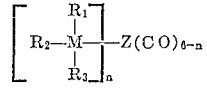

wherein M is an element selected from the group consisting of phosphorus, arsenic, antimony and bismuth, $n$ is a number from 1 to 5, inclusive, Z is a metal selected from the group consisting of chromium, molybdenum, tungsten and uranium, and $R_1$, $R_2$, and $R_3$ are radicals independently selected from the group consisting of hydrogen, halogen, alkyl, alkoxy and aryloxy radicals.

22. Triphenylphosphinechromium pentacarbonyl.

23. Triphenylphosphinemolybdenum pentacarbonyl.

24. Triphenylphosphinetungsten pentacarbonyl.

25. Tris(2-cyanoethyl)phosphine chromium pentacarbonyl.

26. (Triphenyl phosphite)chromium pentacarbonyl.

27. Bis(triphenyl phosphite)chromium tetracarbonyl.

28. Tris(triphenyl phosphite)chromium tricarbonyl.

29. Bis(tri-n-butyl phosphite)chromium tetracarbonyl.

30. Triphenylarsinechromium pentacarbonyl.

31. Triphenylstibinechromium pentacarbonyl.

32. Bis(triphenyl phosphite)molybdenum tetracarbonyl.

33. Tris(triphenyl phosphite)molybdenum tricarbonyl.

34. Tributylphosphinechromium pentacarbonyl.

35. Tris(tributyl phosphite)chromium tricarbonyl.

36. 1,2,4-trimethylbenzene chromium tricarbonyl.

37. 1,2,4,5-tetramethylbenzene chromium tricarbonyl.

38. 1,3,5-triisopropylbenzene chromium tricarbonyl.

39. Bis(triphenyl phosphine)molybdenum tetracarbonyl.

40. The method of preparing bis(triphenyl phosphine) chromium tetracarbonyl which comprises reacting triphenylphosphine-chromium pentacarbonyl with triphenylphosphine.

41. The method according to claim 40 wherein the reaction is carried out in a high boiling ether.

42. A compound of the structure

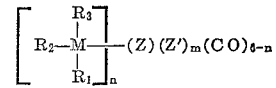

wherein M is selected from the group consisting of arsenic, phosphorus, antimony and bismuth, Z and Z' are selected independently from the group consisting of chromium, molybdenum, tungsten and uranium (with the proviso that if $m=0$, then $Z \neq$ chromium when M=P and $n=2$), $m$ is 0 or 1, $n$ is 1 to 5, inclusive, and $R_1$, $R_2$, and $R_3$ are selected from the group consisting of hydrogen, halogen, alkyl, aryl, alkoxy and aryloxy (with the proviso that when $n>1$, M in plural can consist of different elements).

References Cited in the file of this patent

UNITED STATES PATENTS

| | | |
|---|---|---|
| 2,875,223 | Pederson | Feb. 24, 1959 |
| 2,988,476 | Heininger | June 13, 1961 |
| 3,010,978 | Antonsen | Nov. 28, 1961 |
| 3,013,039 | Lambert et al. | Dec. 12, 1961 |

FOREIGN PATENTS

| | | |
|---|---|---|
| 834,991 | Germany | Mar. 27, 1952 |
| 841,589 | Germany | June 16, 1952 |

OTHER REFERENCES

Malatesta et al.: "J. Chem. Soc.," pages 1186–1188 (1957).

Behrens et al.: "Z. Anorg. u. Allgem. Chemie," vol. 292, pages 151–61 (1957).

UNITED STATES PATENT OFFICE
CERTIFICATE OF CORRECTION

Patent No. 3,117,983                                                      January 14, 1964

Clifford Norman Matthews

It is hereby certified that error appears in the above numbered patent requiring correction and that the said Letters Patent should read as corrected below.

Columns 3 and 4, TABLE I, fourth column, line 12 thereof, for "142. 143" read -- 142-143 --; same TABLE I, second column, line 14 thereof, for "$[(C_4H_9O)_3P]Cr(CO)_3$" read -- $[(C_4H_9O)_3P]_3Cr(CO)_3$ --; same TABLE I, in footnote 2, for "19.5.'" read -- 19.5. --; same TABLE I, in footnote 10, for "$n_d^{25}$" read -- $n_D^{25}$ --; column 10, line 67, for "4,4" read -- 4.4 --; column 11, in the table for EXAMPLE 23, first column, line 1 thereof, for "$[(C_4H1O)_3P]_2Cr(CO)_4$" read -- $[(C_4H_9O)_3P]_2Cr(CO)_4$ --; same column 11, line 65, for "beam" read -- bean --; column 13, line 44, for "chromrium" read -- chromium --.

Signed and sealed this 21st day of July 1964.

(SEAL)
Attest:

ESTON G. JOHNSON                                            EDWARD J. BRENNER
Attesting Officer                                          Commissioner of Patents